(12) United States Patent
    Svoboda et al.

(10) Patent No.: US 8,602,334 B2
(45) Date of Patent: Dec. 10, 2013

(54) DEBRIS VACUUM WITH SUPPLEMENTAL DEBRIS SHEARING SURFACE

(75) Inventors: Steven J. Svoboda, Bloomington, MN (US); Chadwick A. Shaffer, Oakdale, MN (US)

(73) Assignee: The Toro Company, Bloomington, MN (US)

( * ) Notice: Subject to any disclaimer, the term of this patent is extended or adjusted under 35 U.S.C. 154(b) by 410 days.

(21) Appl. No.: 12/961,049

(22) Filed: Dec. 6, 2010

(65) Prior Publication Data

US 2012/0138717 A1 Jun. 7, 2012

(51) Int. Cl.
    *B02C 23/28* (2006.01)
(52) U.S. Cl.
    USPC ........... 241/55; 241/100; 241/169.1; 241/242
(58) Field of Classification Search
    USPC .................. 241/56, 169.1, 194, 55, 100, 242; 15/405, 344, 339; 415/121.1
    See application file for complete search history.

(56) References Cited

U.S. PATENT DOCUMENTS

| | | |
|---|---|---|
| 2,523,034 A | 9/1950 | Lively |
| 3,096,718 A * | 7/1963 | Anderson ................. 415/121.1 |
| 3,688,479 A | 9/1972 | Martinson et al. |
| 3,968,938 A | 7/1976 | Ruhl et al. |
| 4,074,869 A | 2/1978 | Johnson |
| 4,117,983 A | 10/1978 | Browning |
| 4,325,163 A | 4/1982 | Mattson et al. |
| 5,020,309 A | 6/1991 | Hopkins |
| 5,245,726 A | 9/1993 | Rote et al. |
| 5,692,262 A | 12/1997 | Haupt et al. |
| 5,707,017 A | 1/1998 | Paolucci et al. |
| 5,791,568 A | 8/1998 | Keim |
| 5,794,864 A | 8/1998 | Hammett et al. |
| 5,931,396 A | 8/1999 | Firdaus |
| 6,059,541 A | 5/2000 | Beckey et al. |
| 6,629,818 B2 | 10/2003 | Svoboda |
| D498,885 S | 11/2004 | Robson |
| 7,654,480 B2 | 2/2010 | Baer et al. |
| 7,735,188 B2 | 6/2010 | Shaffer |

OTHER PUBLICATIONS

"Toro® 206cc OHV Vacuum Blower: Model No. 62925-280000001 and up" Parts Catalog, Form No. 3360-193 Rev A; The Toro Company, 2008; 24 pgs.

* cited by examiner

*Primary Examiner* — Mark Rosenbaum
(74) *Attorney, Agent, or Firm* — Mueting, Raasch and Gebhardt, P.A.

(57) ABSTRACT

A debris vacuum having one or more rotating shearing edges and at least one supplemental shearing edge in close proximity to the rotating shearing edges. The supplemental shearing edge may be stationary and attached, for example, to a housing containing the rotating shearing edge, or to a vacuum tube that is itself attachable to the housing.

23 Claims, 11 Drawing Sheets

DEBRIS VACUUM WITH SUPPLEMENTAL DEBRIS SHEARING SURFACE

TECHNICAL FIELD

Embodiments of the present invention may relate generally to debris vacuums, e.g., to debris vacuums configured to comminute vacuumed debris.

BACKGROUND

Handheld or portable debris vacuums are commonly used by homeowners and professionals alike for the purpose of removing debris from yards, driveways, sidewalks, etc. These devices are sometimes configured as convertible blower/vacuums ("blower/vac"). A convertible blower/vac is a portable device which can be configured for use as either a debris vacuum or a debris blower. When used in the blower configuration, blower/vacs provide a sweeping action created by the production of a fast moving stream of air generated by a rotating impeller located within a housing of the blower/vac. When used as a debris vacuum, replacement of various blower components on the housing with vacuum attachments allows leaves or other debris to be vacuumed into an attached debris container.

In either configuration, the impeller draws air into the housing through an air inlet and exhausts it through an air outlet. With a debris vacuum, air and entrained debris may be pulled into the unit via the air inlet and expelled via the air outlet into the attached debris container. The operator may then use the comminuted debris as mulch for gardens, flower beds, etc. As one can appreciate, the ability to comminute or shred this debris is advantageous as it permits more dense packing of the debris within the debris container. As a result, the container requires emptying less frequently, potentially allowing the operator to finish vacuuming more quickly.

In many conventional debris vacuums, the impeller assists in the comminution of the vacuumed debris. However, the impeller is typically configured to maximize air flow, e.g., to improve operation as a blower. Although such designs have proven effective for mulching debris, impellers designed for air movement may not necessarily provide optimal shredding capacity.

SUMMARY

The present invention may overcome these and other issues with prior art debris vacuums by providing, in one embodiment, a debris vacuum including a housing defining an air inlet, an air outlet, and an impeller chamber between the air inlet and the air outlet. A powered impeller is also located within the chamber and configured to rotate relative to the housing about an impeller axis. The impeller includes: a base having a first side; and at least one impeller blade disposed upon, and protruding from, the first side of the base. The impeller blade includes a first shearing edge located between a central portion of the base and an outermost radial edge of the impeller blade, wherein the first shearing edge defines a surface of revolution resulting from impeller rotation about the impeller axis. Also included is a stationary member having a second shearing edge that is adjacent to, but offset in a direction parallel to the impeller axis from, the surface of revolution defined by the first shearing edge.

In another embodiment, a debris vacuum is provided that includes a housing defining an air inlet, an air outlet, and an impeller chamber between the air inlet and the air outlet. A powered impeller is located within the chamber and configured to rotate relative to the housing about an impeller axis. The impeller includes: a base having a first side; a hub located centrally on the first side of the base; and at least one impeller blade disposed upon the first side of the base. The impeller blade includes a first shearing edge positioned between the hub and an outermost radial edge of the impeller blade, the first shearing edge defining a surface of revolution resulting from impeller rotation about the impeller axis. A vacuum tube is configured to attach to the housing such that it surrounds the air inlet. A plurality of stationary members are fixed relative to the housing at or near the air inlet, wherein some or all of the plurality of stationary members include a second shearing edge that is adjacent to, but offset in a direction parallel to the impeller axis from, the surface of revolution.

In yet another embodiment, a convertible debris blower and vacuum is provided that includes: a housing defining an air inlet, an air outlet, and an impeller chamber between the air inlet and the air outlet; and a powered impeller located within the chamber and configured to rotate relative to the housing about an impeller axis. The impeller includes: a base having a first side; and at least one impeller blade disposed upon, and protruding from, the first side of the base. The impeller blade includes a first shearing edge located between a central portion of the base and an outermost radial edge of the impeller blade, wherein the first shearing edge defines a surface of revolution resulting from impeller rotation about the impeller axis. A vacuum tube is also included and is configured to attach to the housing such that it surrounds the air inlet, the vacuum tube having a stationary member having a second shearing edge that is adjacent to, but offset in a direction parallel to the impeller axis from, the surface of revolution defined by the first shearing edge when the vacuum tube is attached to the housing. The blower and vacuum also includes: a collection receptacle attachable to the air outlet; an air inlet cover configured to cover the air inlet in place of the vacuum tube; and a blower tube attachable to the air outlet in place of the collection receptacle.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 3A-3B illustrate section views of the debris vacuum of FIG. 1, wherein: FIG. 3A illustrates an exemplary impeller, motor, and vacuum tube in accordance with embodiments of the present invention; and FIG. 3B is an enlarged view of a portion of FIG. 3A;

Figure 1:
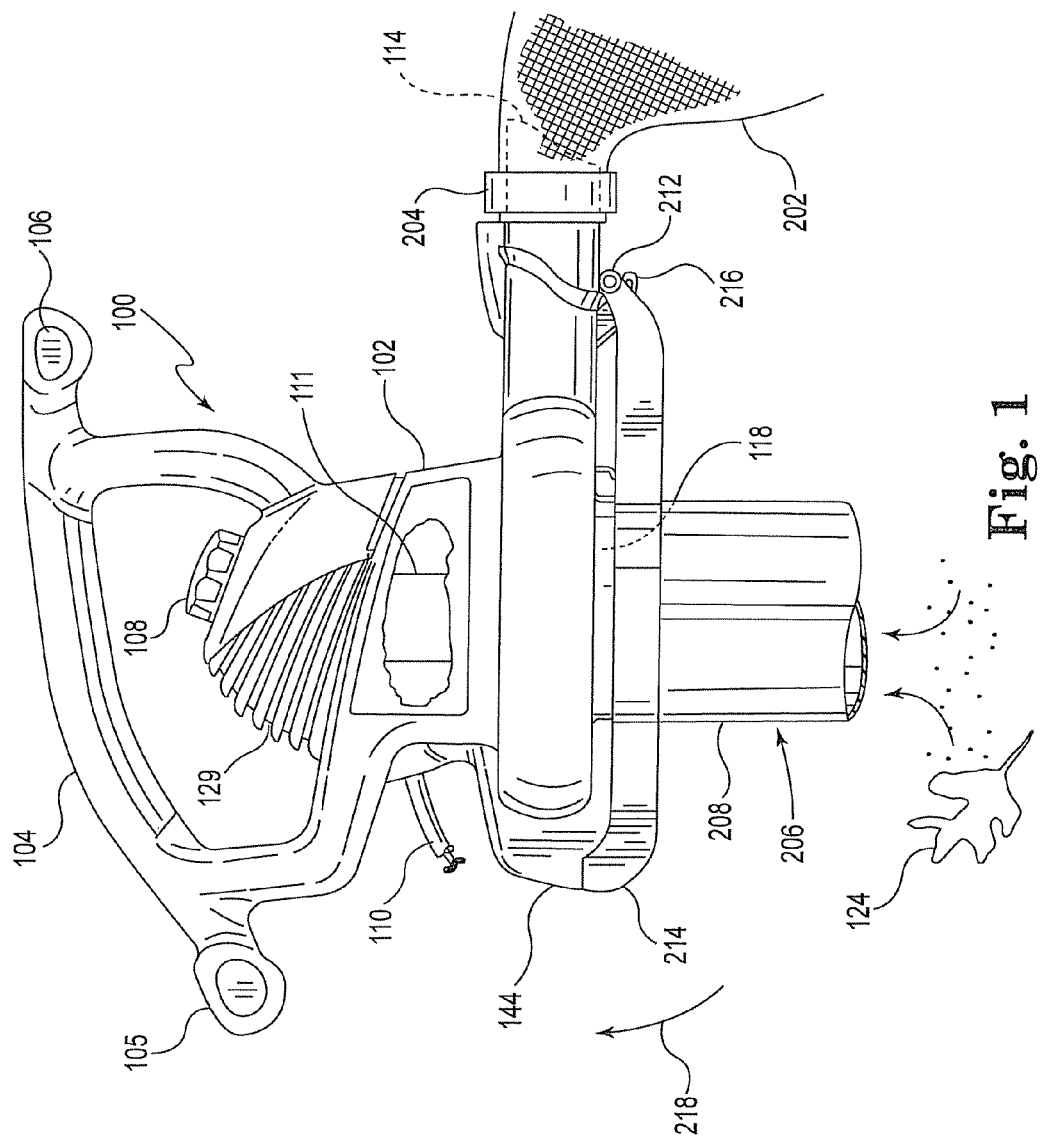
FIG. 1 is a partial cut-away, side elevation view of a debris vacuum (e.g., a handheld blower/vac configured in a vacuum mode) in accordance with one embodiment of the invention.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Embodiments of the present invention are directed generally to debris vacuums, such as portable hand-held units that may operate as either a dedicated vacuum or as a convertible blower and vacuum ("blower/vac"). Embodiments of the present invention may also find application with larger, e.g., ground-supported, vacuums. For purposes of this description, the terms "debris vacuum" and "vacuum" are used interchangeably herein and are understood to include both dedicated units and convertible units configured in a vacuum mode.

Debris vacuums in accordance with embodiments of the present invention may utilize a rotating impeller having one or more blades to create a desired airflow through the unit. At least some of these blades may include a shearing surface or edge capable of comminuting or shredding debris as the air-entrained debris passes through a chamber containing the impeller. Moreover, debris vacuums in accordance with some embodiments of the present invention may include a supplemental or second, e.g., stationary, shearing surface or edge that may interact with the shearing edge of the impeller blade. The addition of this second shearing edge may enhance the shredding capabilities of the vacuum, e.g., by increasing the number of shearing interfaces within the vacuum.

With reference to the drawing, wherein like reference numerals designate like parts and assemblies throughout the several views, FIG. 1 illustrates a side elevation view of a portable, electric debris vacuum 100 in accordance with one embodiment of the invention. While described herein in the context of a portable, corded electric blower/vac, those skilled in the art will appreciate that embodiments of the instant invention could also include most any type of debris vacuum (e.g., small or large gas-engine or battery powered units) without departing from the scope of the invention. For instance, embodiments of the present invention may find application in ground supported (e.g., wheeled) systems such as dedicated walk-behind (embodiments of which are described elsewhere herein) or ride-on vacuums, as well as to vacuum-specific implements that attach to various utility vehicles.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as left, right, forward, rearward, top, bottom, side, upper, lower, above, below, horizontal, vertical, and the like may be used herein and, if so, are from the perspective observed in the particular figure, or as observed when the debris vacuum is in its typical operating position (see, e.g., FIG. 1). These terms are used only to simplify the description, however, and not to limit the scope of the invention in any way.

As shown in FIG. 1, the debris vacuum 100 may typically include a blower housing 102 having one or more handles 104, 105, and 106 configured for grasping with hands of an operator during use. The housing 102 may further include a power cord 110 for receiving external AC power, e.g., from a 120V AC outlet.

To selectively control delivery of electrical power to a motor 111 (see also FIG. 3A) located within the housing, a switch 108 may be provided. In one embodiment, the switch 108 is coupled, e.g., in series, between the power cord 110 and the electric motor 111. The switch 108 may merely open or close a power delivery circuit or, alternatively, may rheostatically vary the power to the motor to provide adjustable motor speed. When powered, the motor 111 may rotate an impeller 122 (see also FIG. 3A), which creates a fast moving air stream pulling air and entrained debris 124 in through an air inlet 118 of the housing and out through an air outlet 114 of the housing.

Except where described below, the construction and operation of the vacuum 100 may be substantially similar to the devices and methods described and illustrated in U.S. Pat. No. 7,735,188 to Shaffer (hereinafter "the '188 patent"), which is incorporated herein by reference in its entirety.

FIG. 1 illustrates the debris vacuum 100 (e.g., convertible blower/vac) as it may be configured for use as a vacuum (i.e., in a vacuum mode). In this configuration, a removable vacuum tube assembly 206 is provided that may include a first (e.g., upper) vacuum tube 208 and a second (e.g., lower) tube 209 (see FIG. 3A), the latter forming a vacuum inlet. The assembly 206, e.g., the upper vacuum tube 208, may include attachment features that permit coupling of the assembly 206 to the housing 102 at the air inlet 118 such that the tube surrounds the air inlet. By surrounding the air inlet, the assembly 206 may prevent air from entering the housing except via passage through the tube 208 (and secondarily via housing vents 129 as further described below). Moreover, a vacuum collection container or receptacle, e.g., a collection bag 202, may be attached or coupled to the air outlet 114 of the housing 102 (e.g., via a vacuum bag collar 204) to contain the collected debris 124a.

In the illustrated embodiment, the vacuum tube 208 of the vacuum tube assembly 206 may include a first vacuum attachment member 212 for attachment of the vacuum tube assembly to a forward portion of the housing 102. It may further include a second vacuum attachment member 214 for attachment of the vacuum tube assembly 206 to a rear portion of the housing 102. In the illustrated embodiment, the first vacuum attachment member 212, which may be configured as a transverse cylindrically-shaped member, may engage a first vacuum attachment receiver 216 located, e.g., integrally formed, on the forward portion of the housing 102. Alternatively, the first vacuum attachment receiver 216 could be formed integral with, or otherwise connected to, the bag 202.

Once the first vacuum attachment member 212 is engaged with the first vacuum attachment receiver 216, the vacuum tube 208 may pivot about the receiver 216 in the direction 218 until the second vacuum attachment member 214 engages a second attachment receiver 144 of the housing 102. The engagement of the second vacuum attachment member 214 with the second attachment receiver 144 may be via a snap fit. Illustrative examples of the construction of the attachment members and receivers (as well as other features of the vacuum 100) may be found, for example, in the '188 patent.

As a result of this exemplary vacuum construction, the powered impeller 122 (see FIG. 3A) may draw air and entrained debris 124 through the air inlet 118 via the vacuum tube assembly 206. As explained in more detail below, the impeller 122 may, in addition to generating the desired air flow, assist in shredding the debris before expelling it out through the air outlet 114 and into the vacuum collection bag 202. The impeller may be constructed of most any material that can withstand the impacts associated with shredding debris. Such materials include, but are not limited to, plastic such as modified polyphenyloxide, acrylonitrile-butadiene-styrene (ABS), and nylon, and metals such as aluminum, steel, and magnesium.

Figure 2:
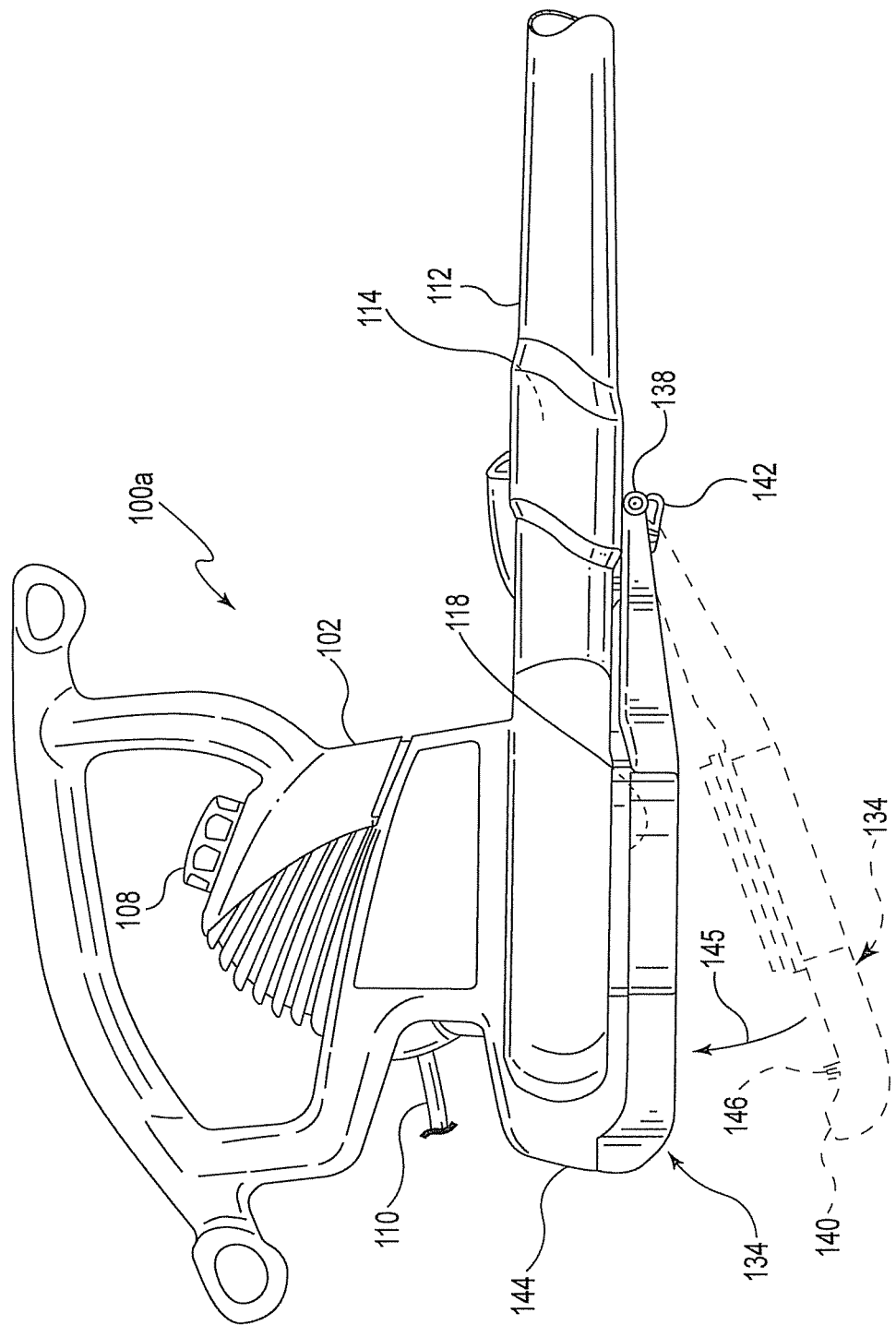
FIG. 2 illustrates the debris vacuum of FIG. 1 as it is reconfigured for use as a blower.

While not necessary to an understanding of embodiments of the invention, FIG. 2 illustrates a view of the vacuum, e.g., convertible blower/vac 100a, reconfigured into a blower mode for blower operation. When operating in blower mode, the blower/vac preferably includes a blower tube 112 having a proximal end removably coupled to the air outlet 114 of the housing 102 in place of the bag 202 (see FIG. 1). An air inlet cover 134 may also replace the vacuum tube assembly 206 as shown in FIG. 2 to removably cover the air inlet 118. The air inlet cover 134 may permit air to pass through the air inlet 118 and into the housing 102 while restricting the entry of foreign objects, e.g., debris. To achieve this function, the air inlet cover 134 may include a grate or screen that covers the air inlet 118 when the cover is installed.

In addition to the grate, the air inlet cover 134 may further include a first attachment member 138 and a second attachment member 140. The first attachment member 138 may be received, in the illustrated embodiment, by a first attachment receiver 142 formed on, or otherwise attached to, the blower tube 112. The second attachment member 140 may likewise be received by the second attachment receiver 144 of the housing 102 similar to the vacuum tube assembly 206.

Like the first vacuum attachment member 212, the first attachment member 138 may have a shape that is generally cylindrical (or at least partially cylindrical), e.g., forming a transverse cylindrical member or pin. The first attachment receiver 142 may form a receiving or mating element, e.g., a J-shaped hook or open-sided hinge, adapted to receive the cylindrically-shaped first attachment member 138.

Once the first attachment member 138 is in place, it may bear against an interior surface of the first attachment receiver 142. With the first attachment member 138 engaged with the first attachment receiver 142, the air inlet cover 134 may pivot, about the first attachment receiver, towards the housing 102 as indicated by arrow 145 in FIG. 2. The second attachment member 140 may thus rotate towards the second attachment receiver 144 (as indicated by arrow 145), where it may ultimately be latched thereto.

Figure 3A:
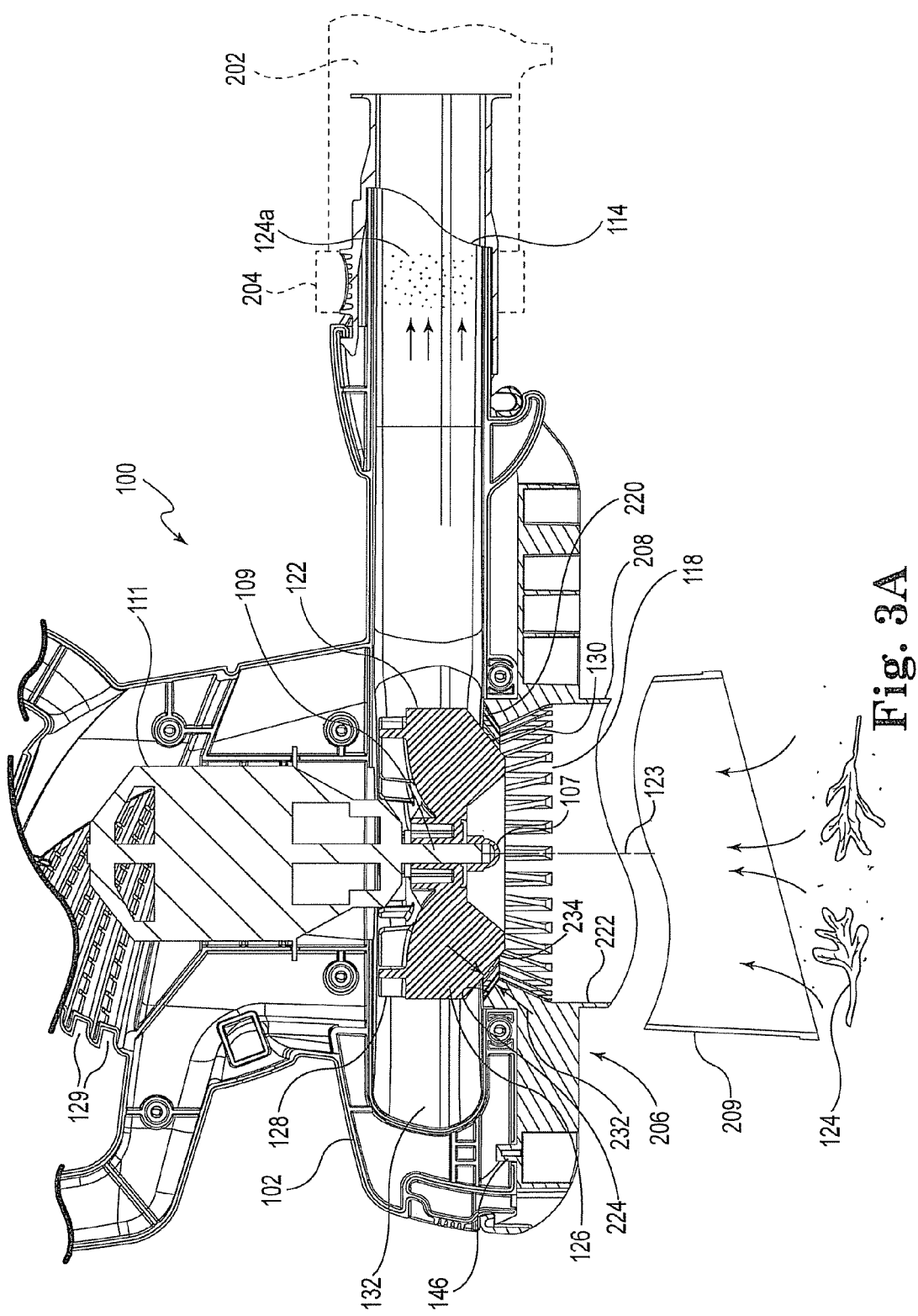

Both the air inlet cover 134 and the vacuum tube assembly 206 may include an interlock engagement member, e.g., protrusion 146 (see FIGS. 2 and 3A). The protrusion may extend into the housing 102 (when the cover or vacuum tube assembly is fully latched to the housing 102) and engage an interlock sensor, e.g., a switch (not shown), contained within or otherwise associated with the housing. The interlock switch, which may be wired in series with the motor 111, may prevent operation of the motor (and thus movement of the impeller 122) unless the vacuum tube assembly 206 (or air inlet cover 134) is properly installed.

Once again, the '188 patent may describe in more detail certain aspects of an exemplary blower/vac similar to that described and illustrated herein (e.g., exemplary embodiments of the housing, air inlet cover, and blower tube). However, unlike known vacuums, debris vacuums in accordance with embodiments of the present invention may also include a supplemental shearing edge or surface as further described below.

Figure 3B:
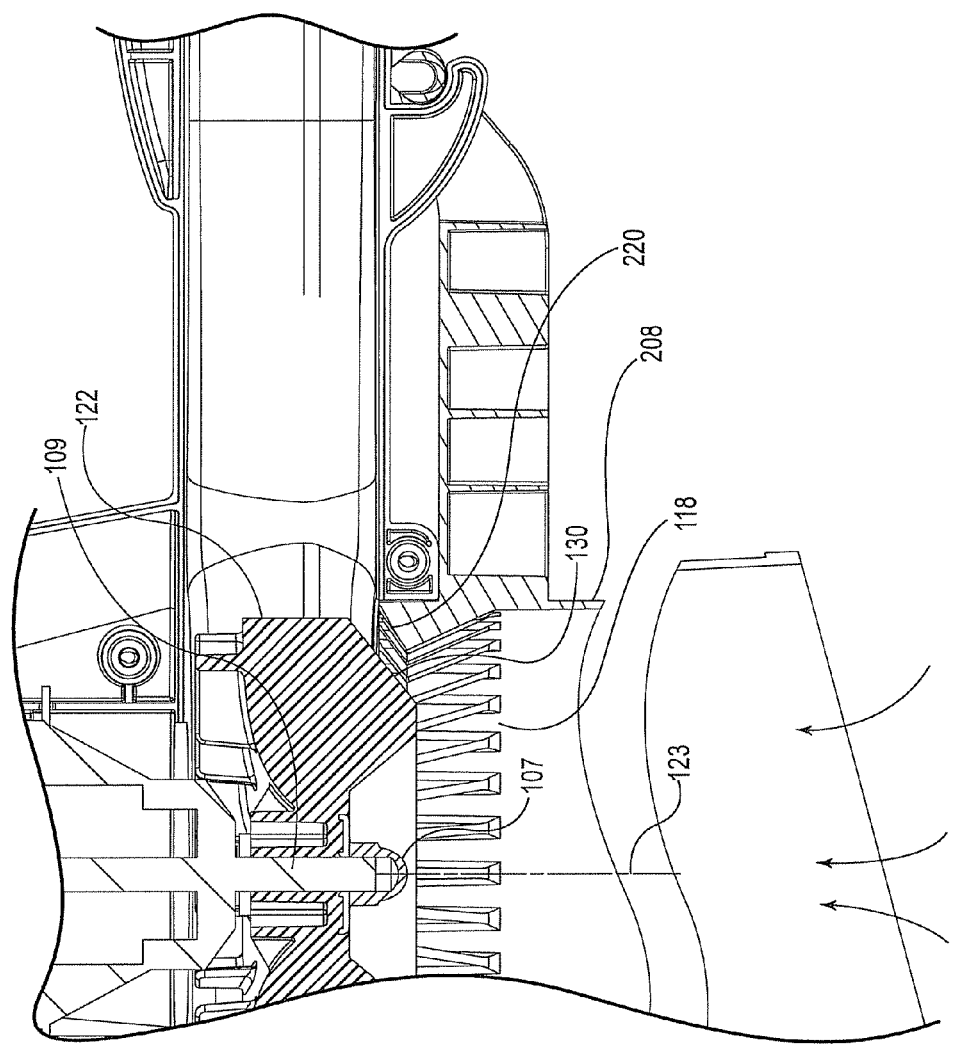

FIG. 3A illustrates a cross-sectional view of the housing 102 of the vacuum 100 with the vacuum tube assembly 206 (tube 208) attached, while FIG. 3B is an enlarged view of a portion of FIG. 3A. The housing 102 may preferably be formed from mating plastic halves which, when assembled, define an interior cavity. The cavity may enclose, among other components, a power source, e.g., the motor 111. The motor may include an output shaft 109 that has its first end coupled to the impeller 122 with connecting hardware (e.g., threaded nut 107). When external electrical power is provided to the motor 111, the output shaft 109, and thus the impeller 122, may rotate relative to the housing about a shaft or impeller axis 123.

Figure 4:
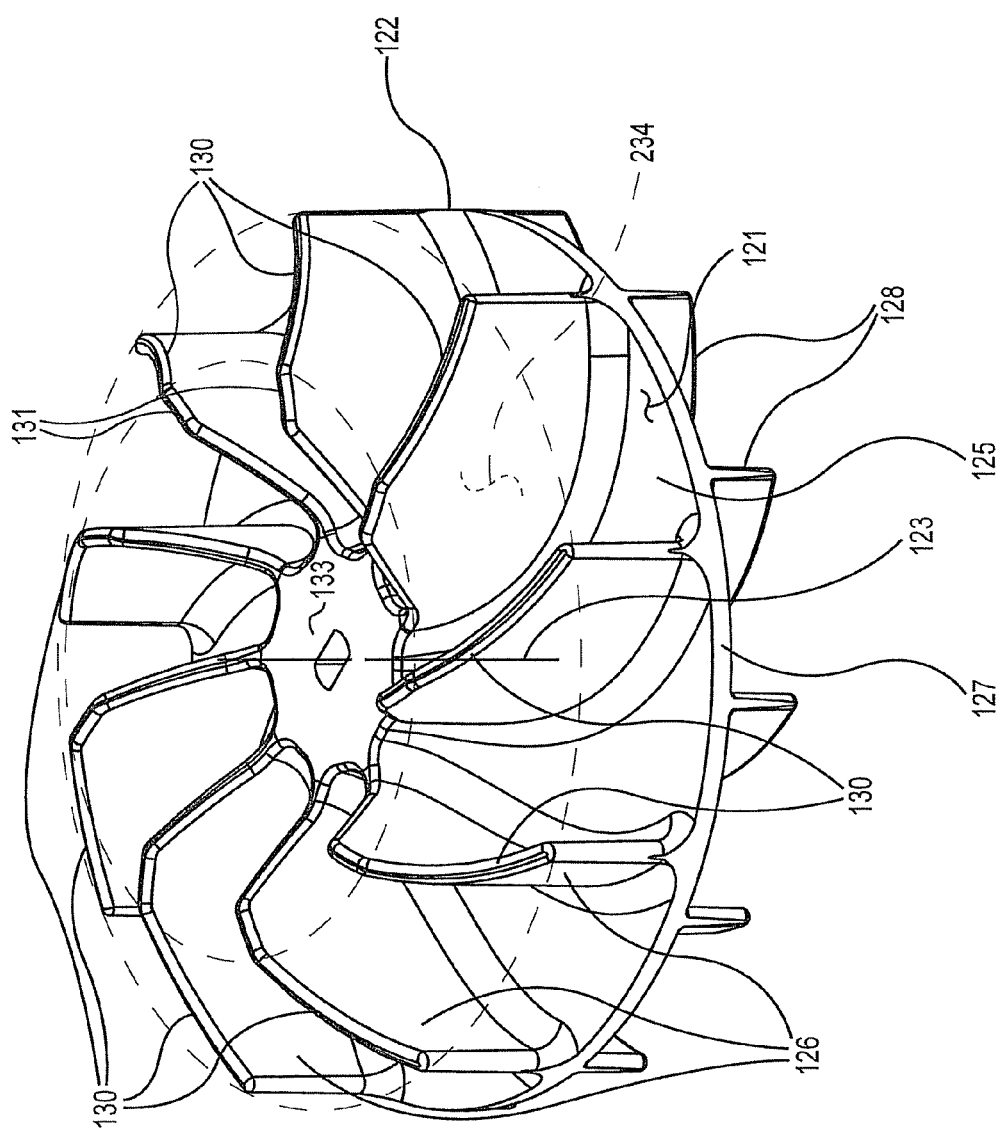
FIG. 4 is an inverted perspective view of the impeller of FIG. 3A.

The impeller 122 may be located within a shaped scroll or impeller chamber 132 defined by the housing 102 and located between the air inlet and the air outlet. The impeller may, in the illustrated embodiment, be defined by a base 125 (see FIG. 4) and one or more, e.g., a plurality of, impeller blades 126 disposed upon, and protruding from, a first side 121 of the base (the section view of the impeller 122 shown in FIGS. 3A-3B is a diagrammatic outline (i.e., it is not a true section view, but rather is a view taken through the axis 123 and along the curvature of the blades 126 to better illustrate the interaction of the impeller blades with other structure as further described below). The base 125 may be defined by a peripheral edge 127 that, in one embodiment, is circular or disk-shaped. As shown in FIG. 4, the blades 126 may be positioned on the base such that they extend in a curved (when viewed parallel to the impeller axis 123) but generally radial direction between a central portion or hub 133 of the base 125 and the peripheral edge 127.

As the impeller 122 rotates about the axis 123, the curved blades 126 may draw air and entrained debris 124 into the chamber 132 through the vacuum tube 208 and the air inlet 118 of the housing 102. The air and debris may then be shredded, as further described below, and the comminuted debris 124a accelerated and exhausted through the air outlet 114 and into the collection bag 202 (see FIGS. 1 and 3A). In the illustrated embodiment, a second set of blades (e.g., cooling blades 128) may also be provided on an upper or second side of the base 125 (opposite the first side 121) of the impeller 122. The second set of blades 128 may draw cooling air over the motor 111 via housing vents 129.

To shred debris, at least one of the blades 126 may include a first shearing edge 130 that, in one embodiment, is spaced-apart, in a direction parallel to the impeller axis 123, from the first side 121 of the base 125. In the illustrated embodiment, the first shearing edge(s) 130 is formed by a portion of one or more of the blades. As a result, the shearing edge(s) may be located between the central portion of the base 125 and an outermost radial (from the axis 123) edge of the blade 126.

With reference to both FIGS. 3A-3B and 4, the shearing edge(s) 130, which are rotating rapidly during operation, may be effective on their own at comminuting debris 124. However, embodiments of the present invention may, as stated above, also include a supplemental or second shearing edge 220 that interacts with the first shearing edges 130 of the impeller blades. It was found that the addition of one or more of these second shearing edges 220 may yield more finely comminuted debris 124a (as opposed to a similar debris vacuum lacking the second shearing edge) and thus permit more dense packing of the shredded debris 124a in the collection bag 202.

In one embodiment, the second shearing edge 220 is formed by a stationary member that may be operatively fixed relative to the housing 102 at or near the air inlet. For example, the stationary member, e.g., second shearing edge(s), may be fixed to, or integral with, an inner surface 222 of the vacuum tube 208 of the vacuum tube assembly 206. Alternatively, the second shearing edge may be attachable (e.g., form a ring) to the housing 102. While a single second shearing edge 220 may yield some benefits, the embodiment of FIG. 3A includes a plurality of stationary members, each forming a second shearing edge 220, which may be, but are not necessarily, equally spaced about a periphery of the air inlet, e.g., about a circumference of the vacuum tube 208, as shown and further described below.

Figure 5:
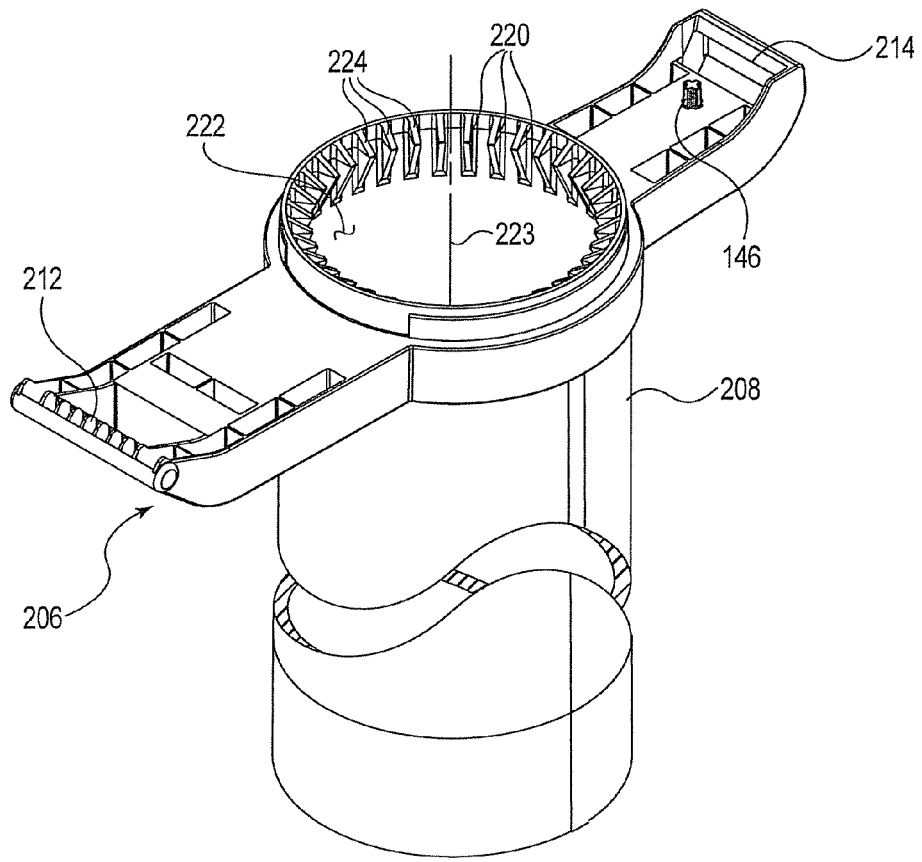
FIG. 5 is a perspective view of the vacuum tube of FIG. 3A.
Figure 6:
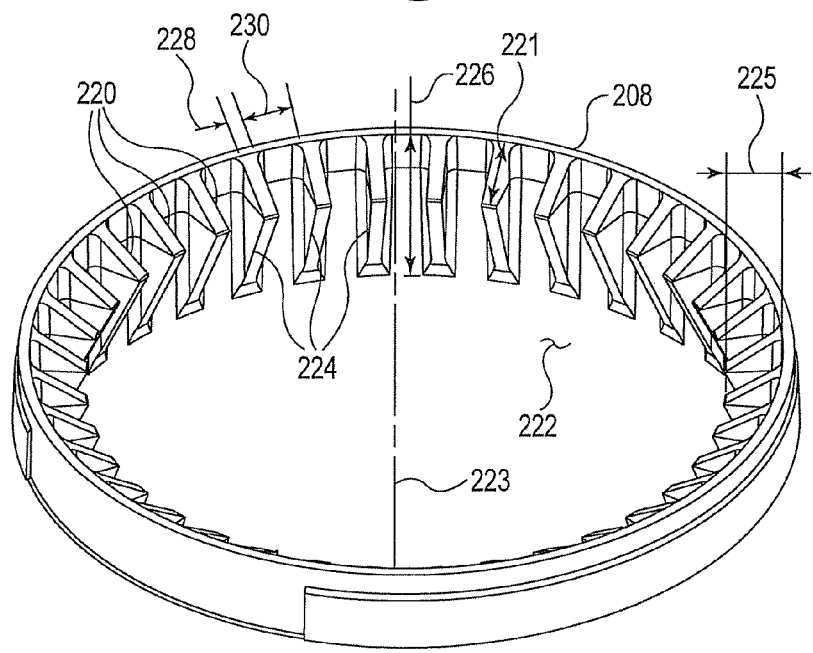
FIG. 6 is an enlarged view of a portion of the vacuum tube of FIG. 5.

FIG. 5 illustrates a perspective view of the inner surface 222 of the vacuum tube 208 and vacuum tube assembly 206 of FIG. 3A, while FIG. 6 illustrates an enlarged view of a portion of FIG. 5. As shown in these views, each of the second shearing edges 220 may be formed by a series of spaced-apart fingers or teeth 224 that protrude inwardly from the inner surface 222 towards a centerline axis 223 (coaxial with the impeller axis 123) of the vacuum tube assembly (e.g., of the vacuum tube 206). The teeth 224 may, in one embodiment, be configured as triangular elements having one side secured or integral formed with the inner surface 222, while an upper portion of each tooth 224 may include an edge that fauns the second shearing surface or edge 220.

The exact number and size of the second shearing edges 220, and thus the number and size of the teeth 224, may vary. However, in one embodiment, the inner surface 222 of the vacuum tube 208 has a diameter of about five inches (in.) and may have formed thereon about 36 teeth. Each tooth 224 may have a height 226 of about 0.65 in., and protrude inwardly a radial distance 225 from the inner surface 222 of about 0.23 in. Moreover, each tooth 224 may have a thickness 228 of about 0.1 in., yielding a gap 230 between teeth of about 0.26 in. When the teeth are configured as described above, each second shearing edge 220 may have an effective length 221 of about 0.28 in.

Each second shearing edge 220 may further be adjacent to, but offset (e.g., evenly offset) in a direction parallel to the impeller axis from, a surface of revolution 234 (see, e.g., FIGS. 3A and 4) defined by the first shearing edge 130 of the impeller 122. Stated another way, each second shearing edge 220 may define a shape that corresponds to a shape of an adjacent or proximate portion of the surface of revolution formed by the first shearing edge 130. In one embodiment, the second shearing edge 220 is evenly spaced-apart from the surface of revolution 234 defined by the first shearing edge 130 such that a uniform distance or gap 232 (see FIG. 3A) of about 0.05 in. to about 0.3 in., preferably 0.05 in. to about 0.2 in. (e.g., about 0.1 in.) is formed. That is, a radial plane containing the centerline axis 123/223 that passes through the impeller and the vacuum tube 208 (when the latter is attached to the housing) may intersect the surface of revolution 234 and one of the teeth 224 along two respective lines that are generally parallel to one another.

As used herein, the term "surface of revolution" refers to the three dimensional surface defined by the shearing edge(s) 130 of the impeller blades 126 as the impeller 122 is rotated about the axis 123. In the illustrated embodiment of FIGS. 3A-3B and 4, the edges 130 may create a generally frusto-conically shaped surface of revolution 234 as depicted in broken lines in FIG. 4. However, other blade configurations may be provided that yield differently-shaped surfaces of revolution without departing from the scope of the invention.

The inclusion of one or more second shearing surfaces (e.g., edges 220) may, via interaction with the first or rotating shearing edges 130 of the blades of the impeller advantageously increase the shredding capability of the vacuum 100. While such an advantage may be realized with a more limited number of second shearing edges, it is believed that the inclusion of multiple second shearing edges 220 spaced along the perimeter of the tube 208 (e.g., along the surface of revolution 234) may further increase shredding performance.

In the embodiment shown in FIGS. 3A, 5, and 6, the teeth 224, and thus each of the second shearing edges 220, are integrally formed with the vacuum tube 208, e.g., the teeth are formed with the vacuum tube 208 via an injection molding process. To produce a durable shearing edge 220 able to withstanding the dynamic shredding environment, the vacuum tube assembly 206 (and thus the shearing edges) may, in one embodiment, be made from plastic (e.g., nylon, modified polyphenyloxide, or ABS). However, other materials (e.g., metals), and other manufacturing methods (e.g., die casting), are certainly possible without departing from the scope of the invention.

Figure 7:
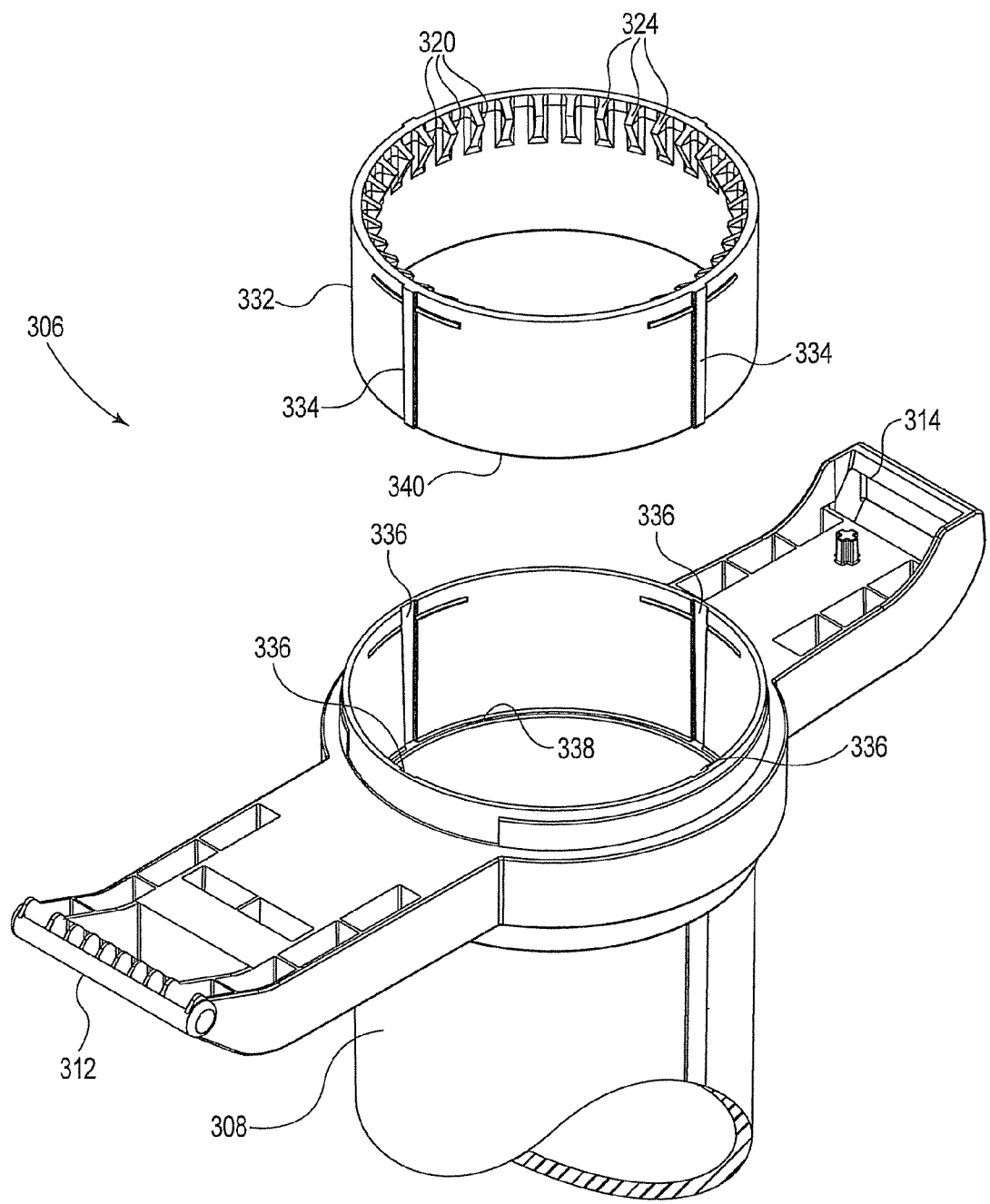
FIG. 7 is a partial exploded perspective view of a vacuum tube having a shearing member insert in accordance with another embodiment of the invention.

FIG. 7 illustrates a vacuum tube assembly 306 in accordance with yet another embodiment of the invention. The assembly 306 is similar in many respects to the assembly 206 already described herein. For instance, it may include a vacuum tube 308 with a first vacuum attachment member 312 and a second vacuum attachment member 314 to attach to the housing 102 in a manner already described herein. However, unlike the vacuum tube assembly 206, the vacuum tube assembly 306 may further include a shearing member insert 332. The insert 332 is, in the illustrated embodiment, configured as a tubular member (e.g., ring) that may be received and seated in the upper end of the vacuum tube 308. The insert 332 may include features, e.g., alignment legs 334 on its outer surface, that are received in corresponding slots 336 on an inner surface of the vacuum tube 308 to assist with coupling the insert to the vacuum tube. The vacuum tube 308 may also define a ledge 338 along its inner surface that may contact an end face 340 of the insert 332 when the latter is fully inserted, thereby limiting the insert's axial insertion depth.

The insert 332 may further include stationary members (e.g., second shearing edges 320) that, like the stationary members/edges 220 described elsewhere herein, are formed as part of one or more teeth 324 formed along an inner diameter of the insert 332. The teeth 324, e.g., edges 320, may be configured, and may function, substantially as described already herein with respect to the teeth 224 and edges 220.

The insert 332 may be retained within the vacuum tube 308 by most any acceptable method including, for example, adhesive bonding, ultrasonic welding, press fit, snap fit, and the like. Alternatively, the insert could be installed in such a way that it is removable by the end user. As an example of the latter, the attachment of the vacuum tube assembly 306 with the housing 102 (see FIG. 1) could assist in retaining the insert in place.

Figure 8:
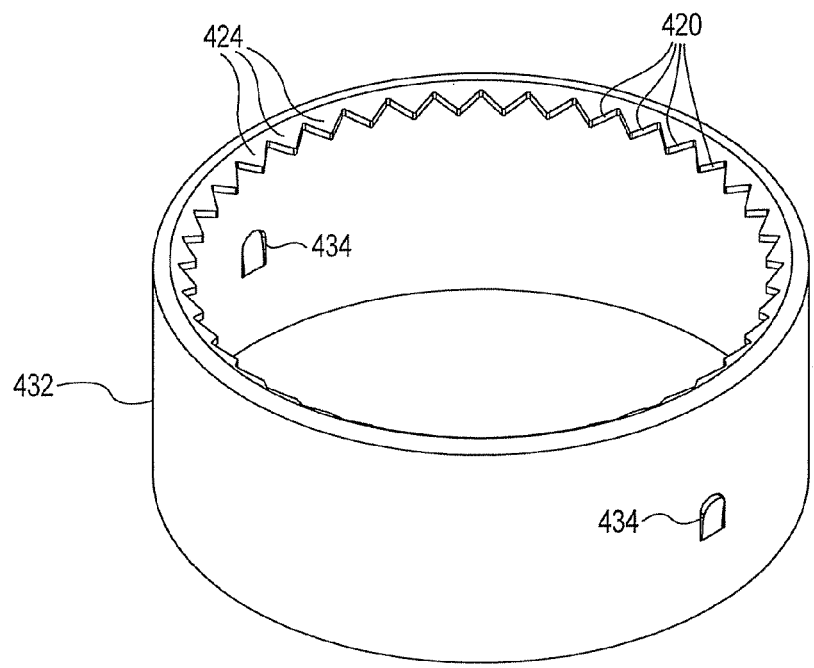
FIG. 8 is a perspective view of a shearing member insert, similar to that illustrated in FIG. 7, in accordance with another embodiment of the invention.
Figure 9:
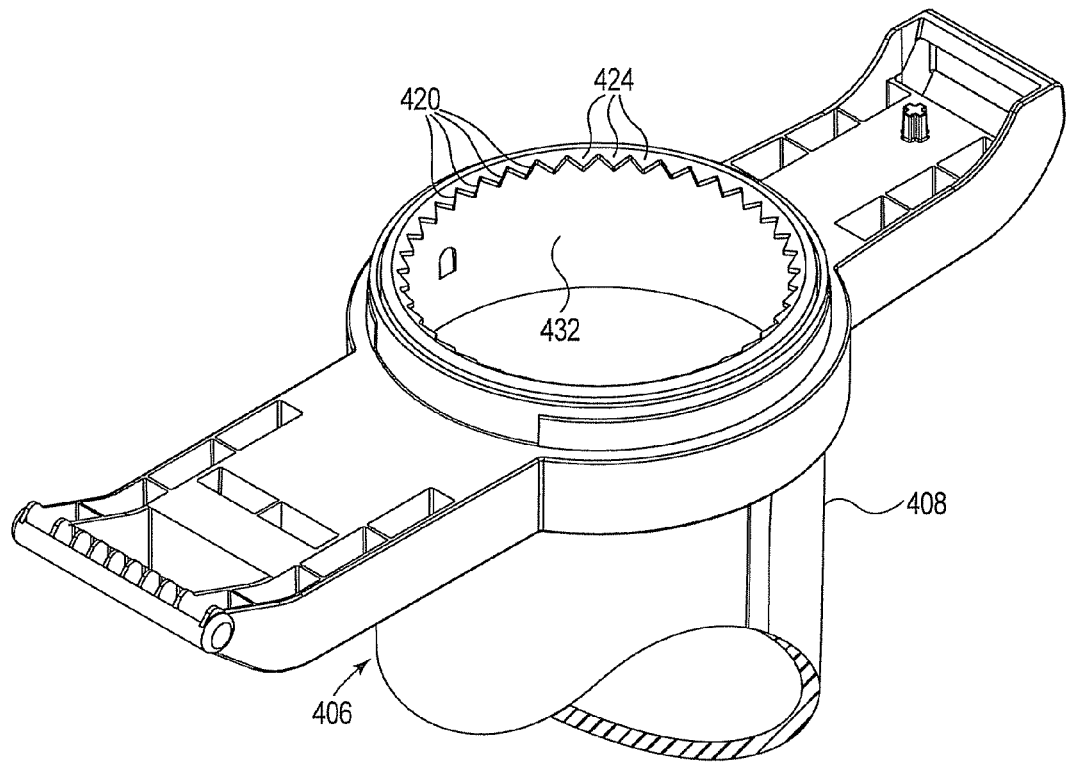
FIG. 9 is a perspective view of the insert of FIG. 8 as inserted into a vacuum tube.

FIGS. 8 and 9 illustrate a vacuum tube assembly 406 in accordance with yet another embodiment of the invention. Like the embodiment of FIG. 7, the vacuum tube assembly 406 may be configured to receive therein an insert 432 having features, e.g., tabs 434, to assist with aligning and securing the insert relative to a vacuum tube 408 of a vacuum tube assembly 406 as shown in FIG. 9.

The insert 432 may again include one or more protrusions or teeth 424 each defining a second shearing edge 420 positionable adjacent the rotating shearing edges 130 of the impeller 122 in a manner already described herein (see, e.g., FIGS. 3A-3B). Unlike the individual teeth 224 and 324 described in the previous embodiments, however, the teeth 424 may be formed as part of a continuous serrated or saw-tooth edge that may extend partially or completely around the circumference of the insert, e.g., along the inner surface of the vacuum tube. The teeth 424 are preferably angled downwardly relative to a longitudinal axis of the insert such that they maintain the second shearing edge 420 in an evenly spaced-apart relationship with the surface of revolution 234 of the impeller 122 in a manner substantially similar to the teeth 224 shown in FIG. 5.

Figure 10:
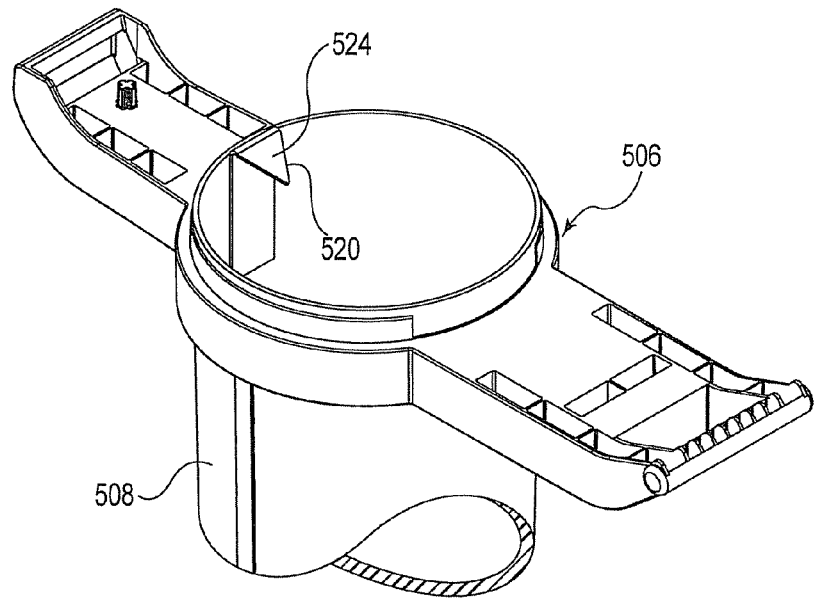
FIG. 10 is a partial perspective view of a vacuum tube in accordance with still yet another embodiment of the invention, the vacuum tube shown with a shearing member insert attached.

FIG. 10 illustrates yet another embodiment of the invention wherein a second shearing edge 520 is shown attached to a vacuum tube 508 of a vacuum tube assembly 506. In the embodiment illustrated in FIG. 10, the second shearing edge 520 is part of an insert that attaches or is integrally formed with the vacuum tube 508. Unlike the previously illustrated embodiments, the insert 532 may form a single tooth 524, e.g., form a single second shearing edge 520. While illustrated as incorporating only a single tooth 524, alternate embodiments may incorporate any number of separate teeth 524 to provide additional second shearing edges 520.

Figure 11:
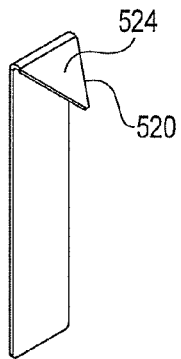
FIG. 11 is a perspective view of the shearing member insert of FIG. 10.

The tooth 524 may, in the illustrated embodiment, be configured as a formed sheet metal member as shown in FIG. 11. The tooth 524 may attach to the vacuum tube 508 via most any acceptable method, e.g., fasteners or mechanical capture. Like the embodiments already described and illustrated herein, the tooth 524 may be formed (e.g., angled) to ensure that the second shearing edge 520 is located in the desired spaced-apart and parallel relationship to the surface of revolution 234 created by the rotating shearing edges 130 of the impeller blades (see, e.g., FIGS. 3A-3B and 4).

Figure 12:
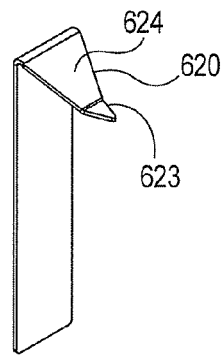
FIG. 12 is a perspective view of a shearing member insert in accordance with yet another embodiment of the invention, the shearing member insert suitable for substitution with the shearing member insert of FIG. 10.
Figure 13:
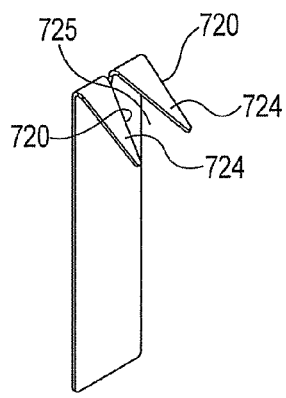
FIG. 13 is a perspective view of a shearing member insert in accordance with another embodiment of the invention, the shearing member insert suitable for substitution with the shearing member insert of FIG. 10.
Figure 14:
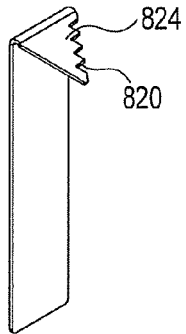
FIG. 14 is a perspective view of a shearing member insert in accordance with still another embodiment of the invention, the shearing member insert suitable for substitution with the shearing member insert of FIG. 10.

FIGS. 12-14 illustrate exemplary alternative teeth that could be substituted for the tooth 524. For instance, FIG. 12 illustrates a tooth 624 having a second shearing edge 620 that is longer and includes a bent tip at its distal end to define yet another shearing edge 623. The shearing edge 623 may be formed to follow the surface of revolution defined by a more inwardly located portion of the blades of the impeller (see, e.g., flat surface 131 of the impeller shown in FIG. 4).

FIG. 13 illustrates yet another insert defining a tooth 724 also having a second shearing edge 720. The tooth 724 may include a notch 725 that divides the tooth into two separate teeth 724, each providing a second shearing edge 720 as shown.

Similarly, FIG. 14 illustrates an insert defining a tooth 824 having a second shearing edge 820. Unlike the second shearing edges 520, 620, and 720 of the teeth 524, 624, and 724, respectively, the second shearing edge 820 of the tooth 824 may be serrated, e.g., include serrations or other cutouts as shown. The serrations may further assist in shredding debris during vacuum operation.

Figure 15:
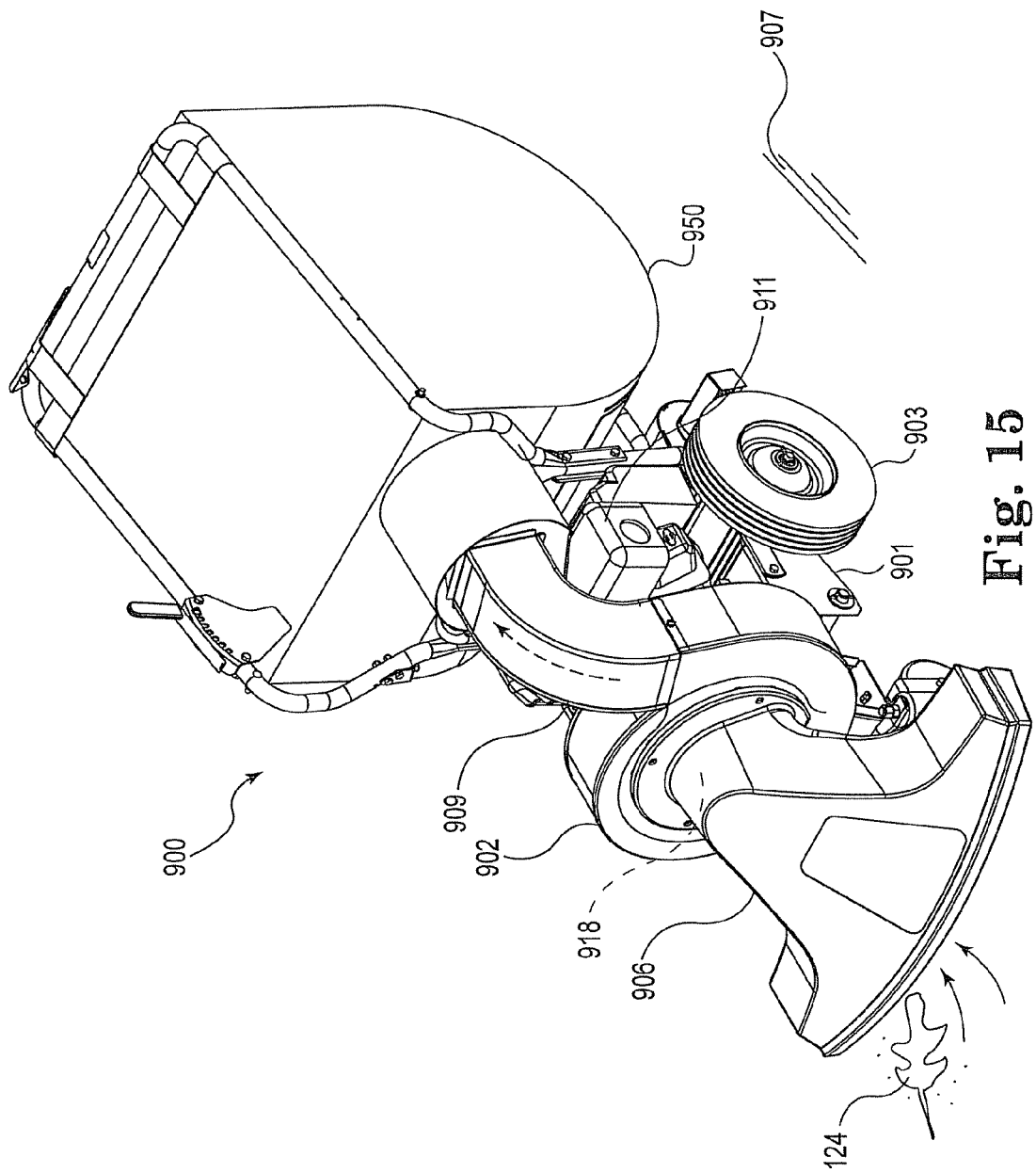
FIG. 15 is a perspective view of a debris vacuum in accordance with another embodiment of the invention.
Figures 16, 17:
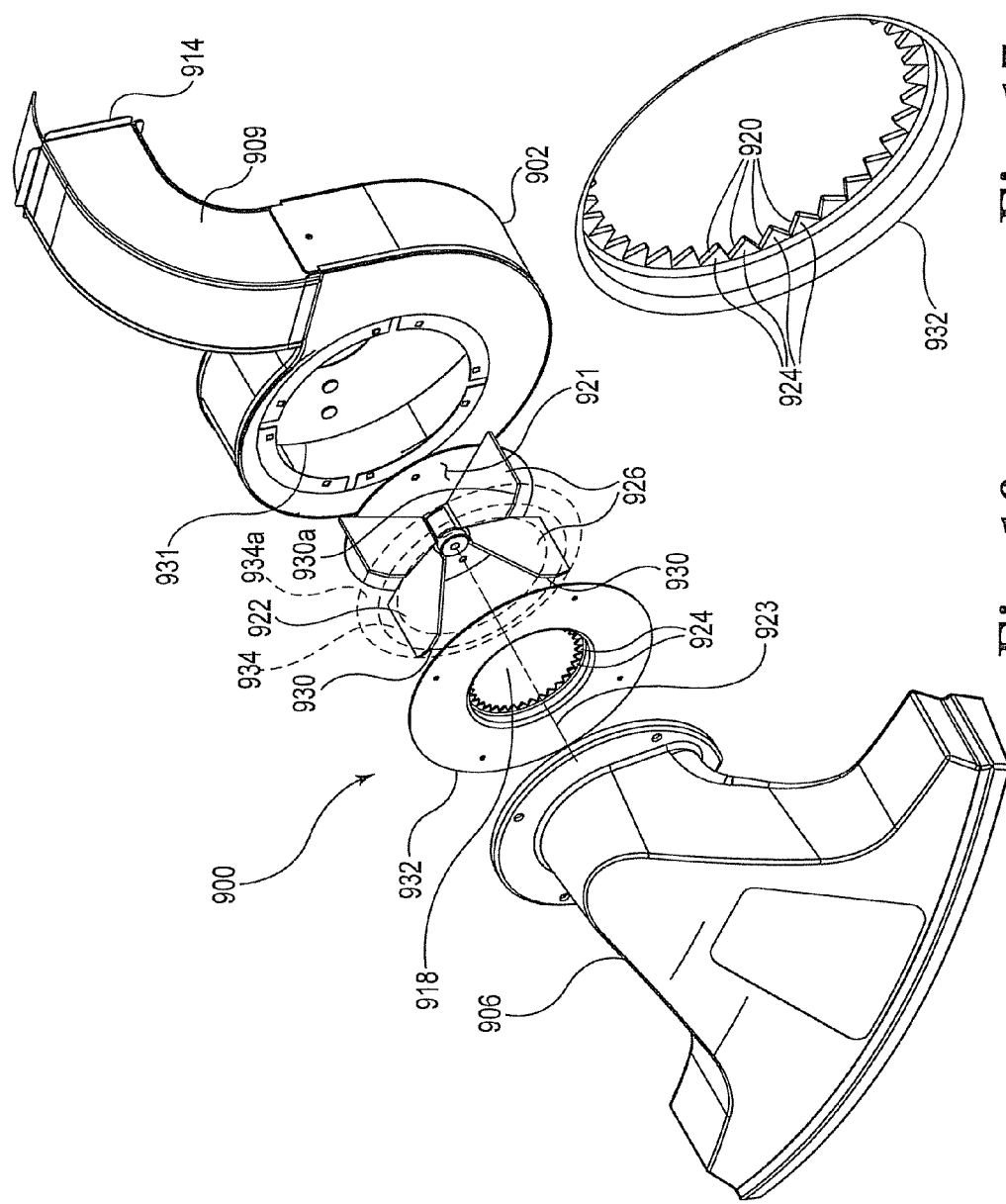
FIG. 16 is an exploded perspective view of a portion of the debris vacuum of FIG. 15.
FIG. 17 is an enlarged view of a portion (e.g., an insert) of the debris vacuum of FIG. 16.

FIGS. 15-17 illustrate a debris vacuum 900 in accordance with another embodiment of the invention. While not wishing to be bound to any particular configuration, the debris vacuum 900 may be configured as a walk-behind, ground-supported vacuum similar to the Model 62925 Walk-Behind Lawn Vacuum/Blower sold by The Toro Company of Minneapolis, Minn., USA. Applicants note that the vacuum 900, unless otherwise indicated herein, may include structure similar to that already described and illustrated herein in the context of FIGS. 1-14. Accordingly, description of such common features/aspects are not further described in detail herein, but are understood to apply to the exemplary vacuum 900.

The vacuum/blower is illustrated in a vacuum mode in FIG. 15. The vacuum 900 includes a housing 902 and an engine 911, both of which are attached to a frame 901. The frame may, in turn, be supported by one or more wheels 903 for rolling engagement of the vacuum 900 over a ground surface 907. The engine 911 may provide rotational power to an impeller 922 (see FIG. 16) contained within an impeller chamber 931 of the housing 902 to rotate the impeller about an impeller axis 923. The impeller may produce suction airflow operable to pull air/entrained debris 124 (see FIG. 15) through a vacuum tube assembly (e.g., vacuum tube 906) and air inlet 918, and expel the shredded debris via an outlet duct 909 (e.g., air outlet 914) into a vacuum bag or receptacle 950.

The impeller 922 may, like the impeller 122, be contained within the scroll or impeller chamber 931 that is operatively located between the air inlet 918 and the air outlet 914. The impeller may further include a base defined by a peripheral, e.g., circular, edge. The base may further include at least one impeller blade 926 formed on a first side 921 of the base. Each blade 926 may include a first shearing edge 930 spaced-apart along the impeller axis 923 from the first side 921 of the base. In one embodiment, the first shearing edge 930 is located between a hub or central portion of the base and the outermost radial edge of the blade. In some embodiments, each blade may extend outwardly beyond the peripheral edge of the base as shown. This first shearing edge 930, like the edge 130 described herein above, may define a surface of revolution 934 (e.g., a planar surface of revolution) as the impeller rotates about the impeller axis 923. In another embodiment, one or more blades 926 could form an additional or alternative first shearing edge 930a, yielding a frusto-conically shaped surface of revolution 934a.

FIG. 16 illustrates a partial exploded view of the vacuum 900. As shown in this view, the vacuum may include an insert 932 that is positionable at or near the air inlet 918, e.g., between the housing 902 and the vacuum tube 906. The insert may be ring-shaped as shown and form one or more stationary members or teeth 924 along its inner surface or edge (e.g., along a periphery of the air inlet) as further illustrated in FIG. 17. The teeth 924 may, in the illustrated embodiment, be configured similar to the teeth 424 described above with respect to the insert 432, e.g., may form a saw-tooth edge.

Each tooth 924 may, like the teeth 424, define at least one second shearing edge 920 that is adjacent to, but offset along the impeller axis 923 from, the surface of revolution defined by the first shearing edge 930. Preferably, the teeth 924 extend parallel to the surface of revolution 934 defined by the first shearing edge 930 (and/or parallel to the surface of revolution 934a defined by the first shearing edge 930a) such that a generally consistent and uniform gap of about 0.05 in. to about 0.3 in. is formed between the surface of revolution 934 (or 934a) and the second shearing edges 920 similar to the gap 232 illustrated in FIG. 3A. Accordingly, the impeller 922 and stationary teeth 924 may function similarly to the impeller 122 and teeth 224 to comminute the debris 124.

During operation, the impeller 922 (powered by the engine 911) may rotate at a speed sufficient to create vacuum pressure, drawing air and entrained debris 124 in through the vacuum tube 906 and the air inlet 918 and out through the duct 909 and air outlet 914. As debris 124 is drawn past the insert 932 and into the housing 902, it may be shredded by action of the first shearing edge(s) 930 and the stationary second shearing edge(s) 920 as already discussed herein. Comminuted debris may then pass, via the duct 909, into the receptacle 950 (see FIG. 15).

Embodiments of debris vacuums that incorporate a rotating first shearing edge and a secondary, e.g., stationary, shearing edge are described and illustrated herein. The inclusion of the second shearing edge may contribute to improved mulching and shredding performance as compared to debris vacuums including only the rotating shearing edge. By producing more finely comminuted vacuum debris, embodiments of the instant invention may, for a given quantity of debris, permit more densely packed debris in the vacuum receptacle. As a result, the operator may potentially complete a vacuum task with less receptacle emptying and, therefore, in less time.

Illustrative embodiments of this invention are discussed and reference has been made to possible variations within the scope of this invention. These and other variations, combinations, and modifications of the embodiments will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A debris vacuum comprising:
a housing defining an air inlet, an air outlet, and an impeller chamber between the air inlet and the air outlet;
a powered impeller located within the chamber and configured to rotate relative to the housing about an impeller axis, wherein the impeller comprises:
a base comprising a first side; and
at least one impeller blade disposed upon, and protruding from, the first side of the base, wherein the impeller blade comprises a first shearing edge located between a central portion of the base and an outermost radial edge of the impeller blade, wherein the first shearing edge defines a surface of revolution resulting from impeller rotation about the impeller axis, the surface of revolution being closer to the outermost radial edge of the impeller blade than to the central portion of the base; and
a stationary member comprising a second shearing edge that is adjacent to, but offset in a direction parallel to the impeller axis from, the surface of revolution defined by the first shearing edge.

2. The vacuum of claim 1, wherein the vacuum further comprises a vacuum tube attachable to the housing such that the vacuum tube surrounds the air inlet.

3. The vacuum of claim 2, wherein the stationary member is part of a ring that removably seats within the vacuum tube.

4. The vacuum of claim 2, wherein the stationary member attaches to the housing between the housing and the vacuum tube.

5. The vacuum of claim 2, wherein the stationary member is an integral portion of the vacuum tube.

6. The vacuum of claim 1, wherein the stationary member comprises one of a plurality of stationary members spaced about a periphery of the air inlet.

7. The vacuum of claim 6, wherein the plurality of stationary members together form a saw-tooth edge.

8. The vacuum of claim 1, wherein the second shearing edge of the stationary member is evenly spaced-apart from the surface of revolution of the first shearing edge such that a uniform gap of about 0.05 inches to about 0.3 inches is formed between the surface of revolution and the second shearing edge.

9. The vacuum of claim 1, wherein the second shearing edge defines a shape that corresponds to a shape of an adjacent portion of the surface of revolution of the first shearing edge.

10. The vacuum of claim 1, wherein the impeller blade is curved when viewed parallel to the impeller axis.

11. The vacuum of claim 1, wherein the surface of revolution of the first shearing edge comprises a frusto-conical shape.

12. The vacuum of claim 1, further comprising a collection receptacle attachable to the air outlet of the housing.

13. The vacuum of claim 1, wherein the second shearing edge comprises one or more serrations.

14. A debris vacuum comprising:
a housing defining an air inlet, an air outlet, and an impeller chamber between the air inlet and the air outlet;
a powered impeller located within the chamber and configured to rotate relative to the housing about an impeller axis, wherein the impeller comprises:
a base comprising a first side;
a hub located centrally on the first side of the base; and
at least one impeller blade disposed upon the first side of the base, wherein the impeller blade comprises a first shearing edge positioned between the hub and an outermost radial edge of the impeller blade, the first shearing edge defining a surface of revolution resulting from impeller rotation about the impeller axis, the surface of revolution being closer to the outermost radial edge of the impeller blade than to the hub;
a vacuum tube configured to attach to the housing such that it surrounds the air inlet; and
a plurality of stationary members fixed relative to the housing at or near the air inlet, wherein some or all of the plurality of stationary members comprise a second shearing edge that is adjacent to, but offset in a direction parallel to the impeller axis from, the surface of revolution.

15. The vacuum of claim 14, wherein the plurality of stationary members forms a ring that is attached to an inner surface of the vacuum tube.

16. The vacuum of claim 14, wherein each of the plurality of stationary members is integrally formed on an inner surface of the vacuum tube.

17. The vacuum of claim 14, wherein each of the second shearing edges is spaced-apart from the surface of revolution of the first shearing edge such that a uniform gap of about 0.05 inches to about 0.3 inches is formed between the surface of revolution and each of the second shearing edges.

18. The vacuum of claim 14, wherein the impeller blade is curved when viewed parallel to the impeller axis.

19. The vacuum of claim 14, wherein the impeller comprises a material selected from the group consisting of metal and plastic.

20. The vacuum of claim 14, wherein the second shearing edge comprises a material selected from the group consisting of metal and plastic.

21. The vacuum of claim 14, wherein the second shearing edge defines a shape that corresponds to a shape of an adjacent portion of the surface of revolution of the first shearing edge.

22. The vacuum of claim 14, wherein the plurality of stationary members are formed on an inner surface of a ring-shaped insert, the insert positionable between the housing and the vacuum tube.

23. A debris vacuum comprising:
   a housing defining an air inlet, an air outlet, and an impeller chamber between the air inlet and the air outlet;
   a powered impeller located within the chamber and configured to rotate relative to the housing about an impeller axis, wherein the impeller comprises:
      a base comprising a first side;
      a hub located centrally on the first side of the base; and
      at least one impeller blade disposed upon the first side of the base, wherein the impeller blade comprises a first shearing edge positioned between the hub and an outermost radial edge of the impeller blade, the first shearing edge defining a surface of revolution resulting from impeller rotation about the impeller axis;
   a vacuum tube configured to attach to the housing such that it surrounds the air inlet; and
   a plurality of stationary members fixed relative to the housing at or near the air inlet, wherein some or all of the plurality of stationary members comprise a second shearing edge that is adjacent to, but offset in a direction parallel to the impeller axis from, the surface of revolution, wherein each of the plurality of stationary members is integrally formed on an inner surface of the vacuum tube.

* * * * *